C. M. PIDGEON.
PARALLEL RULER.
APPLICATION FILED DEC. 30, 1916. RENEWED JAN. 22, 1918.
1,276,955.
Patented Aug. 27, 1918.
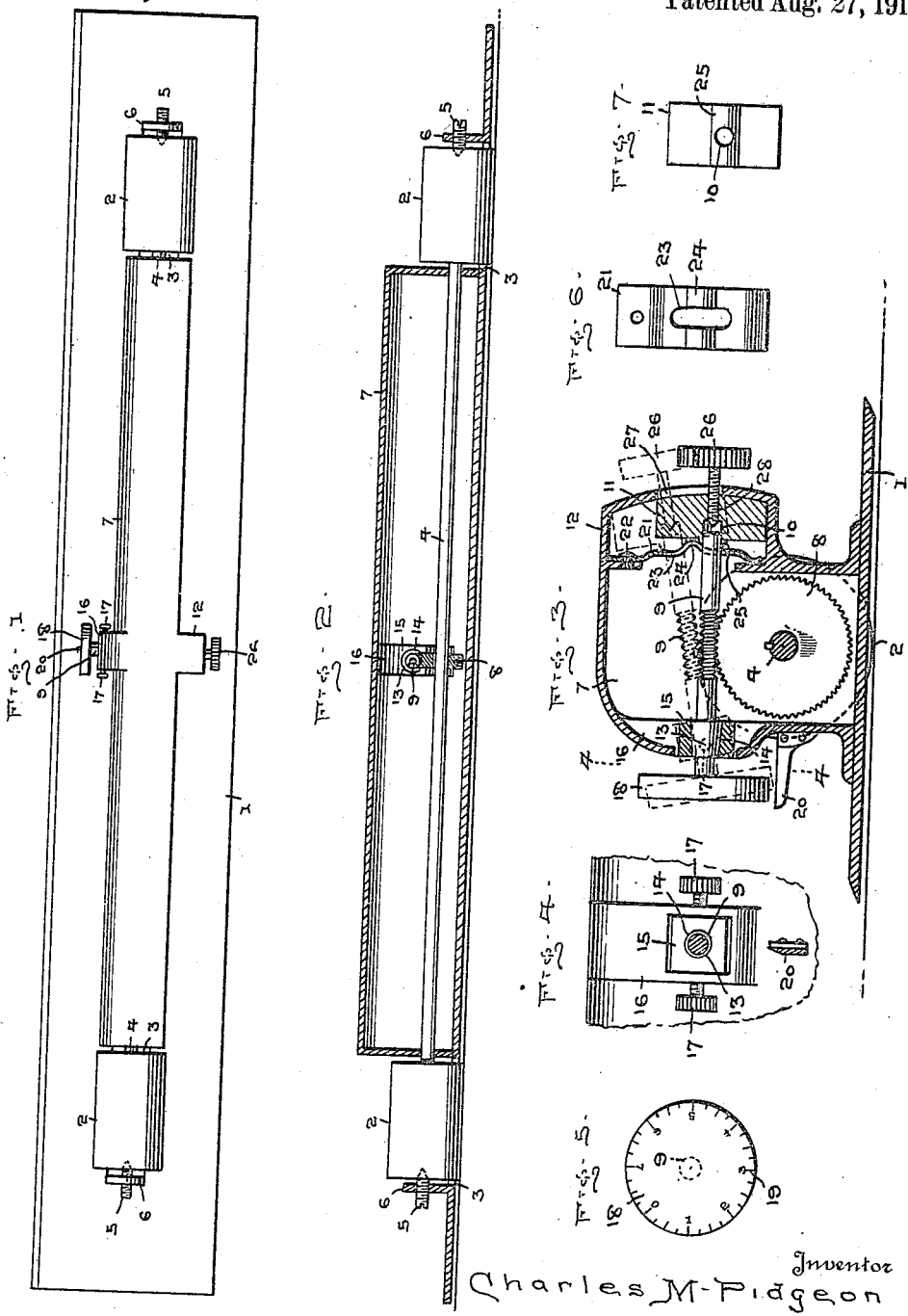
Inventor
Charles M. Pidgeon
By W. J. Fitzgerald
Attorneys

UNITED STATES PATENT OFFICE.

CHARLES M. PIDGEON, OF WASHINGTON, DISTRICT OF COLUMBIA.

PARALLEL-RULER.

1,276,955. Specification of Letters Patent. Patented Aug. 27, 1918.

Application filed December 30, 1916, Serial No. 139,736. Renewed January 22, 1918. Serial No. 213,268.

*To all whom it may concern:*

Be it known that I, CHARLES M. PIDGEON, a citizen of the United States, residing at Washington, in the District of Columbia, have invented certain new and useful Improvements in Parallel-Rulers; and I do hereby declare the following to be a full, clear, and exact description of the invention, such as will enable others skilled in the art to which it appertains to make and use the same.

My invention relates to new and useful improvements in parallel rulers and my object is to provide rollers for the support of the ruler and so position the same that the ruler may be readily moved from point to point and supported by said rollers.

A further object is to provide means for manually rotating said rollers for moving the ruler from place to place.

A further object is to provide means for locking the said rollers against rotating movement.

A further object is to provide means for disconnecting the rotating mechanism from the rollers.

And a further object is to provide means for successively obtaining minute adjustment of the ruler.

Other objects and advantages will be hereinafter set forth and more particularly pointed out in the accompanying specification.

In the accompanying drawings which are made a part of this application,

Figure 1 is a top plan view of a ruler showing my improved device attached thereto.

Fig. 2 is a central longitudinal sectional view thereof.

Fig. 3 is an enlarged transverse sectional view through the ruler, and means for adjusting the same showing one position of the parts thereof in dotted lines.

Fig. 4 is a fragmentary sectional view as seen on line 4—4 of Fig. 3.

Fig. 5 is a front elevation of a graduated dial for regulating the movement of the ruler.

Fig. 6 is an elevation of a spring employed for controlling the position of a worm shaft carrying block, and Fig. 7 is an elevation of the worm shaft carrying block.

Referring to the drawings in which similar reference numerals designate corresponding parts throughout the several views, 1 indicates a ruler of the usual, or any preferred construction, employed for ruling parallel lines upon a surface, and 2 indicates rollers which extend through slots 3 in the ruler and support the ruler a slight distance above the surface over which the same is traveling.

The rollers 2 are connected together by means of a shaft 4 which causes said rollers to rotate in unison, the outer ends of said rollers being supported upon dowels 5 extended through ears 6 projecting upwardly from the ruler, said dowels being preferably adjustable to compensate for any wear. The shaft 4 projects through a housing 7 mounted upon the ruler 1, and in order to regulate the rotation of the rollers 2, a gear 8 is fixed to said shaft, preferably at its longitudinal center, and coöperating with said gear 8 is a worm shaft 9 which extends transversely through the housing, and when rotated, will impart rotation to the rollers through the medium of said gear.

One end of the worm shaft 9 is entered in a seat 10 of a block 11, said block being in turn positioned in an extension 12 of the housing 7, while adjacent the opposite end of said worm shaft is a conical bearing 13 which enters a conical seat 14 of a bearing block 15, said bearing block being pivotally mounted in an extension 16 of the housing 7 by means of set screws 17.

The end of the worm shaft 9 projecting beyond the bearing block 15 is provided with a dial 18 by means of which rotation may be imparted to the worm shaft 9, the outer face of the dial having graduations 19 thereon which coöperate with a finger 20 projecting outwardly from one face of the housing 7, and by providing said graduations, the ruler may be successively moved laterally over a surface and at a uniform distance, by noting the position of the graduations on the dial with respect to said finger.

In order to move the worm shaft out of engagement with the gear 8, so that the rollers may freely rotate, the block 11 is slidably mounted in the extension 12, so that by moving the block 11 to the upper end of the extension 12, the worm shaft 9 will be disengaged from the gear 8, and in order to positively hold the block in its raised or lowered position, a spring plate 21 is positioned within the extension 12 and forms the inner wall thereof, the upper end of the plate being attached to the housing 7 in any preferred manner, as by means of a screw or rivet 22. Extending vertically of the plate 21 and centrally thereof is an elongated slot 23 through which the shaft 9 extends, said plate having bowed portions 24 at its longitudinal center which are engaged by a rib 25 on the block 11, and it will be readily seen that when the block is in its lowered position, the bowed portion 24 will extend over the rib 25 and hold the block and worm shaft in a lowered position, and likewise the bowed portion will project below the rib when the block is elevated, thereby holding the block and shaft in their elevated position.

In order to lock the worm shaft against casual endwise movement and rotation and at the same time bind the block 11 against the outer wall of the extension 12, to assist in holding the block in its raised or lowered position, a thumb screw 26 is entered through a slot 27 in the outer wall of the extension 12 and is threaded through an opening 28 in the block 11 and enters the seat 10, so that the end of the thumb screw will bear against the end of the worm shaft 9, when the thumb screw is turned inwardly, thereby forcing the block 11 against the outer face of the extension 12 and holding the worm shaft 9 sufficiently rigid to prevent casual rotation of the gear 8 and parts to which it is attached.

In applying this device to use, the thumb screw 26 is turned outwardly sufficient to release the shaft 9, and one edge of the ruler placed approximately at the point where it is desired to rule a line, when the dial 18 is rotated to bring the edge of the ruler accurately to the point where the line is to be drawn. After one line is drawn, the dial 18 is rotated and the ruler moved away from the line just drawn to the position for drawing the next succeeding line, and by noting the graduations on the face of the dial, the edge of the ruler may be brought to the exact position for drawing the next and succeeding lines the proper distance from the preceding line, and if desired, in order to hold the ruler perfectly rigid while each line is being made, the thumb screw may be operated to bind against the worm shaft as soon as the ruler has been properly adjusted and again released when the ruler is to be moved.

By controlling the rotation of the rollers 2 in the manner described, not only minute and positive adjustment of the ruler may be obtained, but by locking the worm shaft against casual rotation, the ruler will be prevented from rolling off of an inclined surface or leaving the position where last used, thus retaining the ruler at all times in proper position to be spaced from the last line until all of the lines have been made.

It will likewise be seen that this device can be cheaply constructed and that the same will last indefinitely and may be quickly manipulated to space the ruler over the surface of the object upon which the lines are to be drawn.

What I claim is:—

1. In a device of the class described, the combination with a ruler, rollers mounted upon the ruler and extending therethrough, and a shaft connecting said rollers, of a gear fixed to said shaft, a worm shaft extending over and coöperating with said gear, means to manually rotate said worm shaft, and means to move the worm shaft into and out of engagement with said gear.

2. In a device of the class described, the combination with a ruler, a pair of rollers mounted upon said ruler and extending therethrough, and a shaft connecting said rollers, of a gear fixed to said shaft, a worm shaft extending transversely of the first shaft and coöperating with said gear, means for manually rotating said worm shaft, means to move said worm shaft into or out of engagement with said gear, and means to lock the worm shaft against casual rotation.

3. In a device of the class described, the combination with a ruler, rollers mounted upon said ruler, and a shaft connecting said rollers, of a gear fixed to said shaft, a housing surrounding said shaft, a worm shaft extending transversely through the housing, means to pivotally and rotatably mount one end of said worm shaft in the housing, a block having a seat to receive the opposite end of said worm shaft, said block being movably mounted in said housing, means to hold said block in its raised or lowered position, and means to lock said worm shaft against casual rotation.

In testimony whereof I have signed my name to this specification in the presence of a subscribing witness.

CHARLES M. PIDGEON.

Witness:
C. A. NEALE.

Copies of this patent may be obtained for five cents each, by addressing the "Commissioner of Patents, Washington, D. C."